Sept. 29, 1953 P. D. BECKER 2,653,415
SWIVEL FASTENER
Filed May 13, 1949 2 Sheets-Sheet 1

INVENTOR:
PHILIP D BECKER,
BY Philip E. Parker
ATTORNEY.

Sept. 29, 1953     P. D. BECKER     2,653,415
SWIVEL FASTENER
Filed May 13, 1949     2 Sheets-Sheet 2
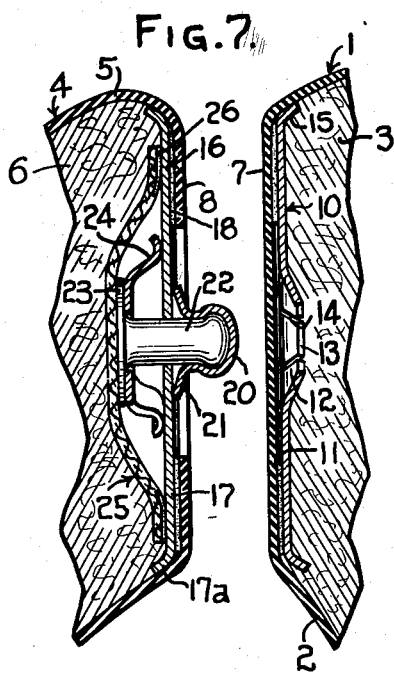
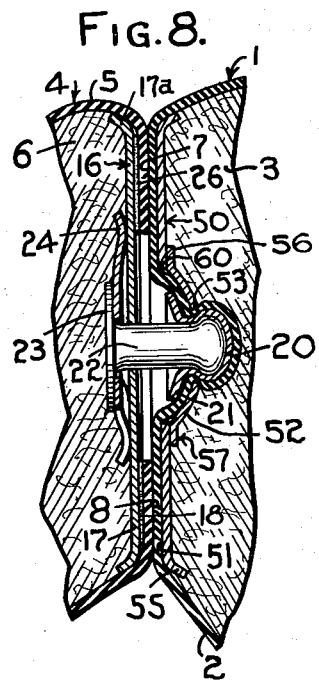
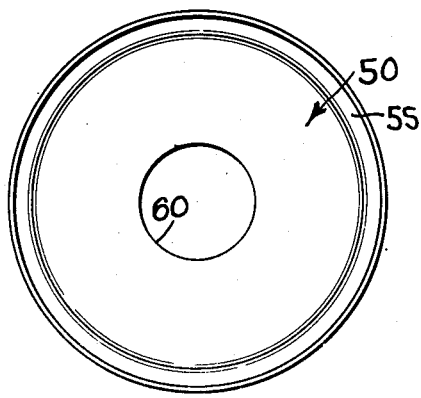
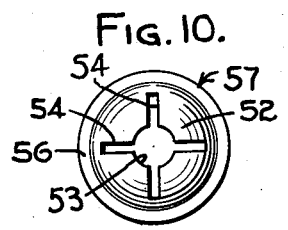
INVENTOR:
PHILIP D. BECKER,
BY Philip E. Parker
ATTORNEY.

Patented Sept. 29, 1953

2,653,415

UNITED STATES PATENT OFFICE 2,653,415

SWIVEL FASTENER

Philip D. Becker, Hingham, Mass., assignor to United-Carr Fastener Corporation, Cambridge, Mass., a corporation of Massachusetts Application May 13, 1949, Serial No. 93,090

1 Claim. (Cl. 46—173)

The present invention relates to fasteners, and more particularly to fasteners adapted to be permanently connected but permitting a rotary swivelling action of one fastener part relative to another, and aims generally to improve existing fasteners of that type.

One object of the invention is the provision of an improved fastener composed of a pair of cooperating fastener parts adapted to be securely connected together by a snap fastener action while permitting relative rotation and swivelling movement of one fastener part relative to another.

A further object of the invention is the provision of a fastener composed of a pair of co-operating fastener parts adapted to be securely connected together by a snap fastener action against subsequent separation except by forces tending to distort the parts, yet which will provide for limited movement of the members axially with respect thereto as well as unrestricted relative rotation thereof.

A still further object of the invention is the provision of a simple efficient and economical fastener adapted to effect a permanent connection of relative rotatable parts, as for example the relatively movable limbs and torso portions of stuffed dolls, animals and like figures.

A still further object of the invention is the provision of a swivel snap fastener in which parts of the interlocking fastener members are of substantial areas adapted to be connected in a cement like manner to rubber sheeting or the like to provide a movable watertight connection therebetween.

The above and other aims and advantages of the invention will be apparent to persons skilled in the art to which the invention relates from a consideration of the accompanying drawings and annexed specification illustrating and describing preferred embodiments of the invention.

In the drawings:

Fig. 7 is a sectional view illustrating the fastener parts secured within two parts of a doll body and prior to connecting the doll body parts together;

Fig. 8 is an enlarged vertical sectional view similar to Fig. 2 illustrating another embodiment of the improved fastener of the invention;

Fig. 9 is an enlarged plan view of the bearing member for the female fastener member of the embodiment of Fig. 8; and Fig. 10 is an enlarged plan view of the female fastener member of the embodiment of Fig. 8.

Figure 1:
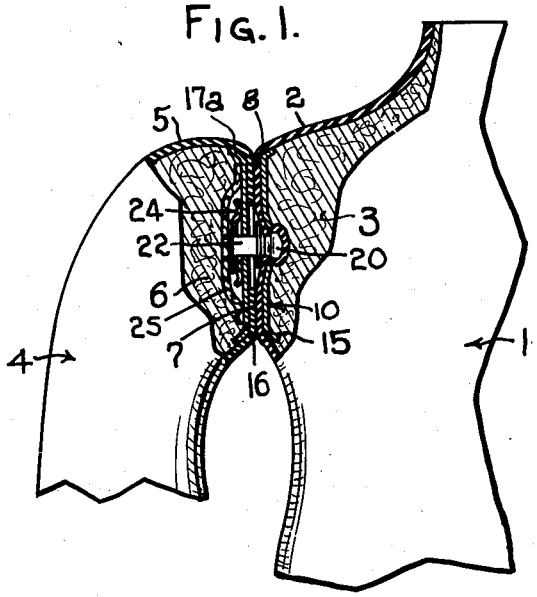
Fig. 1 is an elevation, partly in section, of a portion of the torso and limb of a doll and illustrating the improved fastener of the invention in relation therewith.

Referring to the drawings, the improved fastener is illustrated as a means for connecting the limbs to the torso or body portion of a doll figure or the like, both of which may include a flexible covering member enclosing a fastener part and a suitable padding.

As herein illustrated, the torso or body portion 1 may be formed of a flexible covering 2, for example a rubber-like sheeting, and filled with a suitable stuffing 3 to shape the body to desired form. The arms or limbs 4 are likewise formed of a flexible covering 5, for example, of rubber-like sheeting and are adapted to be similarly filled with a stuffing 6. The torso 1 and limbs 4 are provided with relatively movable abutting joint surfaces 7 and 8, respectively, to the inner surface of which are secured in a cement like manner members of a cooperating snap fastener adapted to permanently connect the parts together and permit relative swivelling movement of the limbs relative to the torso. As herein illustrated, the socket member of the fastener is secured to the joint surface 7 within the torso 1 and the male or stud fastener member is secured to the joint surface 8 within a limb 4.

Figure 2:
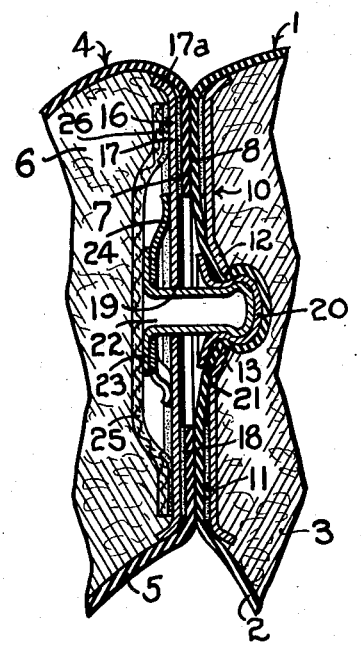
Fig. 2 is an enlarged vertical sectional view of the fastener shown in Fig. 1.
Figure 3:
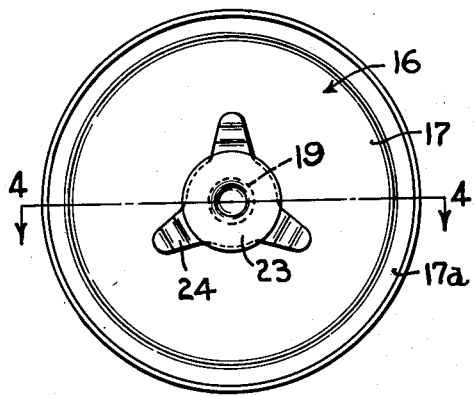
Fig. 3 is an enlarged plan view of the male fastener member.
Figure 5:
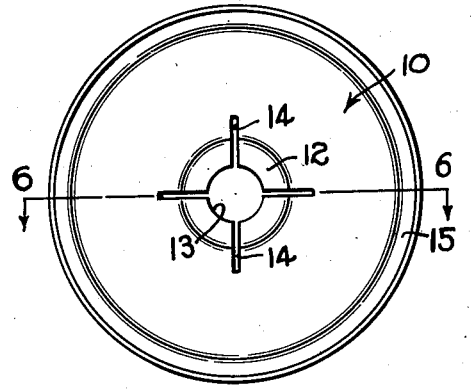
Fig. 5 is an enlarged plan view of the female fastener member.
Figure 4:
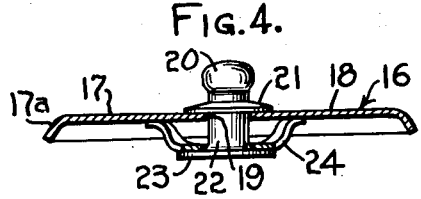
Fig. 4 is a cross sectional view thereof as taken on the line 4—4 of Fig. 3.
Figure 6:
Fig. 6 is a cross sectional view thereof as taken on the line 6—6 of Fig. 5.

The socket fastener member 10 of the embodiment shown in Figs. 1 to 7 may preferably be formed of thin resilient sheet material, for example sheet metal, and advantageously comprises a disc member having a substantially planar attaching portion 11 of substantial area surrounding a series of inwardly curved resilient fingers 12 surrounding and defining a central stud-receiving aperture 13. These fingers 12 may be formed by dimpling an area of the attaching portion 11 surrounding the aperture 13 and radially slitting the dimpled portion as at 14 to provide inwardly extending convergent ratchet fingers 12 surrounding the stud-receiving opening 13. The peripheral edge of the disc member 10 may be flanged as at 15 to define the outer periphery of the joint surface of the part to which the socket fastener member is to be attached, herein illustrated as the joint surface 7 of the torso 1.

The socket member 10 is desirably secured to the inner surface of the covering 2, as by means of a suitable waterproof cement uniting the large area planar attaching surface 11 to the covering 2. Preferably the socket fastener member is secured in the torso portion 1 prior to completing the body and the covering 2 overlying the socket member 10 is left imperforate as illustrated in Fig. 7.

The stud fastener member 16 is adapted to be secured with a part to be attached to the part carrying the cooperating socket member 10, herein illustrated as the limb part 4, and comprises a disc-attaching member 17 having a planar attaching surface 18 of relatively large area, adapted to be attached in a cement like manner to the inner surface of the covering or sheeting 5. The attaching disc may be provided with a peripheral flange 17a to define the marginal limits of the joint surface 8 of the part to which it is attached.

The stud member attaching plate 17 is centrally apertured as at 19 to slidably receive a shank portion 22 of a stud fastener assembly which preferably includes a bulbous stud head 20 and sealing flange 21 disposed on the outer side of the plate 17, a shank portion 22 slidably extended through the aperture 19 and a base portion 23 disposed on a side of the plate 17 opposite the stud head 20 and sealing flange 21. The shank portion 22 is preferably integral with the base portion 23 and is of sufficient length that when upset within the hollow bulbous stud head 20 the base portion 23 and sealing flange 21 will be secured on opposite sides of the plate in a unitary structure reciprocable in the aperture 19.

The stud assembly is preferably normally maintained in a retracted position relative to the plate 17 by means of a leaf spring member 24 surrounding the shank portion 22 and interposed between the base portion 23 and plate 17. If desired, a cover member 25 of waterproof material, for example rubber sheeting, may overlie the base portion 23 and be adhesively secured at its periphery to the plate 17, as at 26, to provide a watertight seal against the entrance of moisture to the stuffing 6 of the limbs 4.

When the cooperating stud and socket fastener members have been assembled with their respective parts 4 and 1 as above described, said parts may be secured together simply by forcing the parts together axially of the fastener to cause the stud to enter the stud-receiving opening 13 of the socket. In so doing, the portion of the covering 2 overlying the dimpled portion of the socket may be stretched over the stud head or may be punctured by it. In either case, when the stud head is fully inserted in the socket and is gripped by the fingers 13, the sealing flange will be pressed tightly into the covering material 2 and provide a watertight seal against the entrance of moisture to the interior of the body 1.

When the stud and socket fastener parts are secured together, the parts 1 and 4 are permanently connected against separation but a swivel action is permitted between the parts 1 and 4 by reason of the loose rotative connection between the plate 17, spring 24 and stud shank 22. The spring 24 also holds the parts 1 and 4 in tensioned engagement.

Another embodiment of the improved fastener of my invention is shown in Fig. 8. The stud member 16 of this embodiment is the same as that shown with respect to the embodiment of Figs. 1 through 7 and is assembled to the limb 4 in the same manner. However, in illustrating this embodiment the cover member 25 has been omitted, since the tight fit between the shank 22 and the aperture 9 may be relied upon to provide sufficient seal against the entrance of moisture to the stuffing 6 of the limb 4. This embodiment differs from the other in that it has a two-piece socket member instead of a one-piece socket member. One piece is a female socket member 57 preferably formed of thin resilient sheet material comprising an outer flat rim portion 56 from which extend inwardly a series of curved resilient fingers 52 surrounding and defining a central stud-receiving aperture 53. These fingers 52 may be formed in the same manner as the fingers 12 of the other embodiment. The other part is a bearing plate 50 preferably formed of sheet material and preferably having an upstanding peripheral flange 55 and having a central aperture 60 somewhat smaller in diameter than the outer rim 56 of the socket member 57.

The fastener of this embodiment may be assembled with the torso body 1 and limb 4 in the same manner as the first embodiment except that the socket member 57 must be held in position during the insertion since it is not affixed to the bearing plate. In Fig. 8 the bearing plate is not shown to be adhesively attached to the covering, since it may be held in position during the insertion of the stud into the socket member. After the stud is engaged in the socket member, the sealing flange 21 on the stud engages the outer surface of the covering 2 opposite the fingers 53 providing a watertight seal and the rim 56 is held in bearing engagement with the bearing plate and pressing it against the inner surface of the covering 2 and causing the outer surface thereof to engage the outer surface of the covering 5 of the limb 4.

The two-piece construction of the socket member of this second embodiment makes it possible to make each of the two pieces of the material that is particularly adapted for the purpose to be served by the particular part. Also lateral pulls on the stud of the assembled fastener cause the socket member 57 to slide laterally on the bearing plate 50 and the sealing flange 21 to jam against the edge of the aperture 60 with the cover material 2 therebetween. The force of such jamming action is distributed over a larger area in this second embodiment than if the force had to be borne by the area of contact between the stud head and socket member fingers. Consequently, lateral tensions have less tendency to cut or tear the covering 2 of the torso 1 of this embodiment.

From the above it will be seen that the improved fastener provides a simple, efficient, watertight swivel connection between parts to be permanently and swivelly connected, as for example the limbs and torso of a doll or the like.

Although I have illustrated and described preferred embodiments of the invention, I do not intend to be restricted to the details thereof as the scope of the invention is best defined in the appended claim.

I claim:

A fastener installation comprising a pair of relatively movable members, each having an outer covering of elastic sheet material, the covering of one having an aperture, a first plate member having an aperture and having one face secured to portions of the inner surface of the covering of said one member surrounding the aperture therein, a stud member having a shank extending through the aperture of said first plate in slidable relation thereto, a base flange disposed within said one movable member, and a head disposed on the other side of said plate providing an annular shoulder adjacent the shank, a second plate member disposed within the other movable member and comprising an apertured plate with one face secured to the inner surface of the covering of said second movable member and a locking member having a flat rim in engagement with portions of the inner face of said plate adjacent the aperture therein and angularly inwardly extending resilient fingers circumferentially spaced about asid rim in locked engagement with the shoulder on the head of the stud, the head of said stud member and portions of the shank adjacent thereto being assembled with said other movable member with the covering thereof stretched over said head and adjacent portions of the shank and the inner ends of said resilient fingers in locking engagement through the covering with the shoulder on said head, and a spring member disposed between the flange of said stud and said first plate to urge the separation thereof and the biasing of the portions of the surfaces of the coverings of said movable members underlying said plates in frictional engagement.

PHILIP D. BECKER.

References Cited in the file of this patent

UNITED STATES PATENTS

| Number | Name | Date |
|---|---|---|
| 901,132 | Waltz | Oct. 13, 1908 |
| 1,612,943 | Reiter | Jan. 4, 1927 |
| 1,811,262 | De Sana | June 23, 1931 |
| 1,904,122 | Chapman | Apr. 18, 1933 |
| 2,316,732 | Weinstein | Apr. 13, 1943 |

FOREIGN PATENTS

| Number | Country | Date |
|---|---|---|
| 20,601 | Great Britain | 1914 |
| 60,763 | Switzerland | of 1913 |
| 236,484 | Germany | of 1911 |
| 369,366 | Italy | of 1939 |